US012698774B2

(12) United States Patent
Moens et al.

(10) Patent No.: US 12,698,774 B2
(45) Date of Patent: Aug. 4, 2026

(54) METHOD FOR CONTROLLING AN AIR-COOLED COMPRESSOR OR VACUUM PUMP DEVICE AND AN AIR-COOLED COMPRESSOR OR VACUUM PUMP DEVICE

(71) Applicant: ATLAS COPCO AIRPOWER, NAAMLOZE VENNOOTSCHAP, Wilrijk (BE)

(72) Inventors: Wim Moens, Wilrijk (BE); Daniel Staljanssens, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 37 days.

(21) Appl. No.: 18/881,514

(22) PCT Filed: Jul. 5, 2023

(86) PCT No.: PCT/IB2023/056957
§ 371 (c)(1),
(2) Date: Jan. 6, 2025

(87) PCT Pub. No.: WO2024/009233
PCT Pub. Date: Jan. 11, 2024

(65) Prior Publication Data
US 2026/0028932 A1 Jan. 29, 2026

(30) Foreign Application Priority Data
Jul. 8, 2022 (BE) .................................. 2022/5559

(51) Int. Cl.
*F04C 29/04* (2006.01)
*F04B 39/06* (2006.01)
(Continued)

(52) U.S. Cl.
CPC .......... *F04C 29/042* (2013.01); *F04B 39/062* (2013.01); *F04B 39/066* (2013.01);
(Continued)

(58) Field of Classification Search
None
See application file for complete search history.

(56) References Cited

U.S. PATENT DOCUMENTS

2013/0204510 A1 8/2013 Brinkmann et al.
2020/0240415 A1 7/2020 Kotani

FOREIGN PATENT DOCUMENTS

CN 101863212 B 4/2014
CN 114688032 A 7/2022
DE 10 2019 131 921 A1 5/2021

OTHER PUBLICATIONS

European Office Action dated Dec. 1, 2025 in Application No. 23 744 243.9.

(Continued)

*Primary Examiner* — Juan G Flores
(74) *Attorney, Agent, or Firm* — Sughrue Mion, PLLC

(57) ABSTRACT

A method for controlling an air-cooled compressor or vacuum pump device (1) for compressing a gas, which is provided with a motor (5) having a fixed speed, wherein the compressor or vacuum pump device (1) is provided with an air-cooled cooler (14) having a fan (15) for cooling a cooling medium that is injected into a compressor or vacuum pump element of the compressor or vacuum pump device, respectively, characterized in that the method comprises the step of switching off the fan (15) when the compressor or vacuum pump device (1) is idling.

13 Claims, 4 Drawing Sheets

(51) Int. Cl.
*F04C 18/16* (2006.01)
*F04D 27/00* (2006.01)

(52) U.S. Cl.
CPC ............ *F04C 18/16* (2013.01); *F04D 27/004* (2013.01); *F05D 2270/02* (2013.01); *F05D 2270/303* (2013.01)

(56) References Cited

OTHER PUBLICATIONS

International Search Report of PCT/IB2023/056957 dated Sep. 27, 2023 [PCT/ISA/210].
Written Opinion of PCT/IB2023/056957 dated Sep. 27, 2023 [PCT/ISA/237].
International-Type Search Report of PCT/IB2023/056957 [PCT/ISA/201].
Written Opinion Separate Sheet of PCT/IB2023/056957 [PCT/ISA/237].

METHOD FOR CONTROLLING AN AIR-COOLED COMPRESSOR OR VACUUM PUMP DEVICE AND AN AIR-COOLED COMPRESSOR OR VACUUM PUMP DEVICE

CROSS REFERENCE TO RELATED APPLICATIONS

This application is a National Stage of International Application No. PCT/IB2023/056957 filed on Jul. 5, 2023, claiming priority based on Belgium Patent Application No. 2022/5559 filed on Jul. 8, 2022.

BACKGROUND OF THE INVENTION

Field

The present invention relates to a method for controlling an air-cooled compressor or vacuum pump device for compressing a gas.

Background

In particular, the invention is intended for an air-cooled compressor or vacuum pump device comprising a motor having a fixed speed, wherein the compressor or vacuum pump device is provided with an air-cooled cooler having a fan for cooling a cooling medium that is injected into a compressor or vacuum pump element of the compressor or vacuum pump device, respectively. Such compressor or vacuum pump devices cannot be continuously switched off and then on again as the demand for compressed gas or vacuum decreases and then increases.

As a result, they regularly run unloaded, with little or no compressed gas or vacuum being supplied to meet temporarily reduced demand.

Such compressor or vacuum pump devices are provided with a cooler having a fan, for example, to cool the cooling medium that is injected into a compressor or vacuum pump element of the compressor or vacuum pump device, respectively.

This cooling is necessary to prevent a high temperature rise of the gas when the gas is compressed. Such a high temperature rise can damage the device, and the compression of the gas would take place in an energy inefficient manner.

However, this fan consumes energy. In addition, in the known compressor or vacuum pump devices, this fan is turned on almost continuously. In this case, it should also be noted that excessively high cooling by the fan causes condensate to form in the compressed gas, which condensate could cause corrosion or leakage in the compressor or vacuum pump device.

SUMMARY OF THE INVENTION

The present invention aims at solving the aforementioned and other disadvantages.

In particular, the present invention aims at providing a method for controlling such compressor or vacuum pump devices, wherein the energy consumption is limited to a minimum.

In addition, the present invention can aim at providing a method for controlling such compressor or vacuum pump devices, wherein the formation of condensate is limited or prevented.

For this purpose, the invention relates to a method for controlling an air-cooled compressor or vacuum pump device for compressing a gas, which is provided with a motor having a fixed speed, wherein the compressor or vacuum pump device is provided with an air-cooled cooler having a fan for cooling a cooling medium that is injected into a compressor or vacuum pump element of the compressor or vacuum pump device, respectively, characterized in that the method comprises the step of switching off the fan when the compressor or vacuum pump device is running unloaded.

An advantage of such a method is that energy savings can be achieved by switching off the fan.

Preferably, the method comprises the additional step of switching off the fan when the compressor or vacuum pump device is running unloaded if the temperature at the outlet of the compressor element is below a certain threshold temperature, wherein the threshold temperature is higher than the dew point.

In this way, condensation can be prevented at all times, while at the same time saving as much energy as possible by switching off the fan.

Preferably, when the compressor or vacuum pump device is running unloaded, the method comprises the additional step of controlling the fan according to the following rule:

- when the temperature at the outlet of the compressor element exceeds a certain first temperature: switch on the fan.

The advantage of this is that energy is saved even when the compressor or vacuum pump device is running unloaded because the fan is only switched on when it is actually needed.

The invention also relates to an air-cooled compressor or vacuum pump device provided with a motor having a fixed speed, wherein the compressor or vacuum pump device is provided with an air-cooled cooler having a fan for cooling a cooling medium that is injected into a compressor or vacuum pump element of the compressor or vacuum pump device, respectively, characterized in that the fan is provided with a control unit that is provided with a control algorithm for carrying out a method according to the invention.

Such an air-cooled compressor or vacuum pump device will use less energy than the known air-cooled compressor or vacuum pump device because the fan is controlled according to a control algorithm that the method according to the invention follows.

BRIEF DESCRIPTION OF THE DRAWINGS

To better demonstrate the features of the invention, the following describes, as a non-exhaustive example, some preferred embodiments of a method for controlling an air-cooled compressor or vacuum pump device and an air-cooled compressor or vacuum pump device according to the invention, with reference to the accompanying drawings, in which:

FIG. 2 schematically shows a method for controlling the air-cooled compressor device from FIG. 1;

FIG. 3 schematically shows a first alternative method for controlling the air-cooled compressor device from FIG. 1;

DETAILED DESCRIPTION OF THE INVENTION

Figure 1:
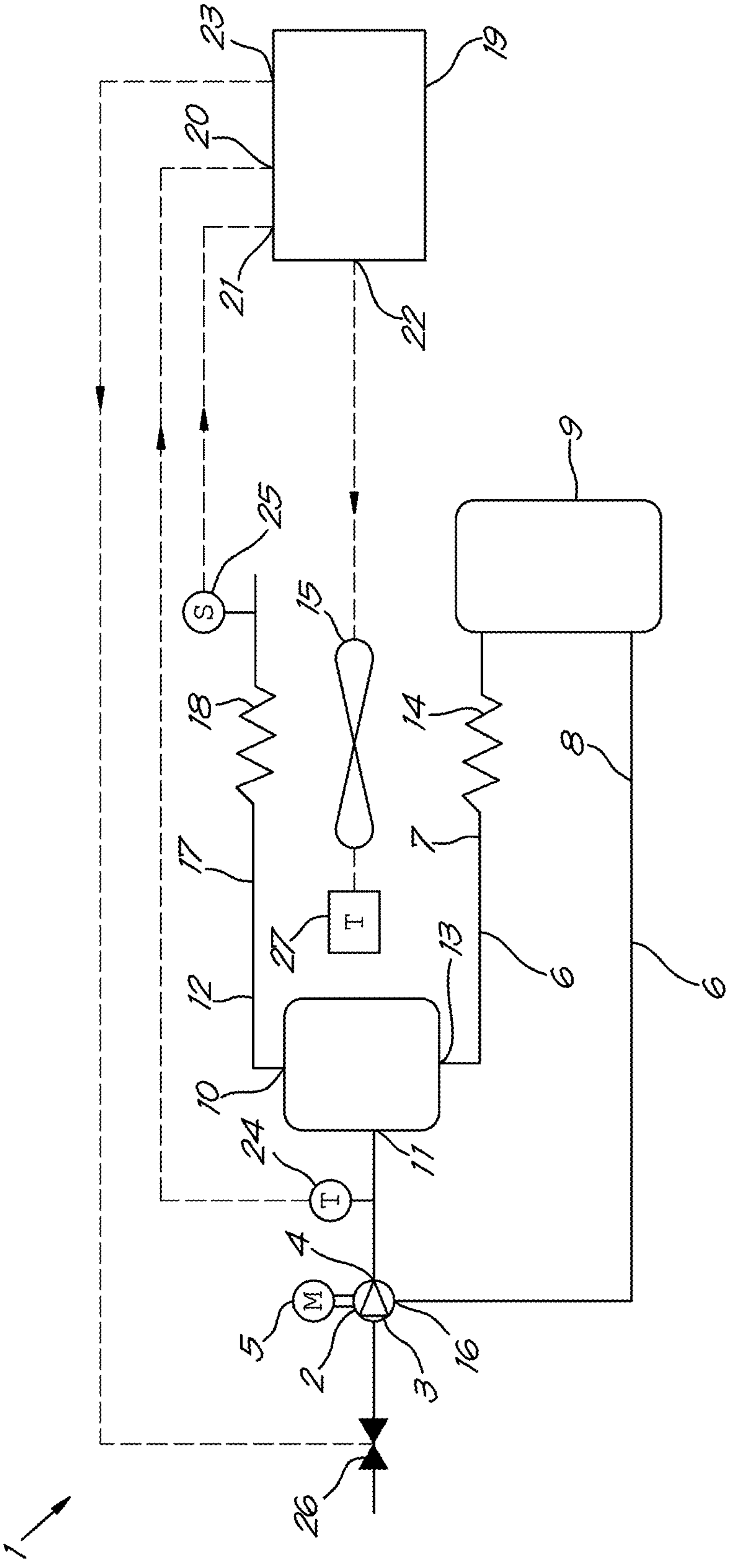
FIG. 1 schematically shows an air-cooled compressor device according to the invention.
Figure 9:
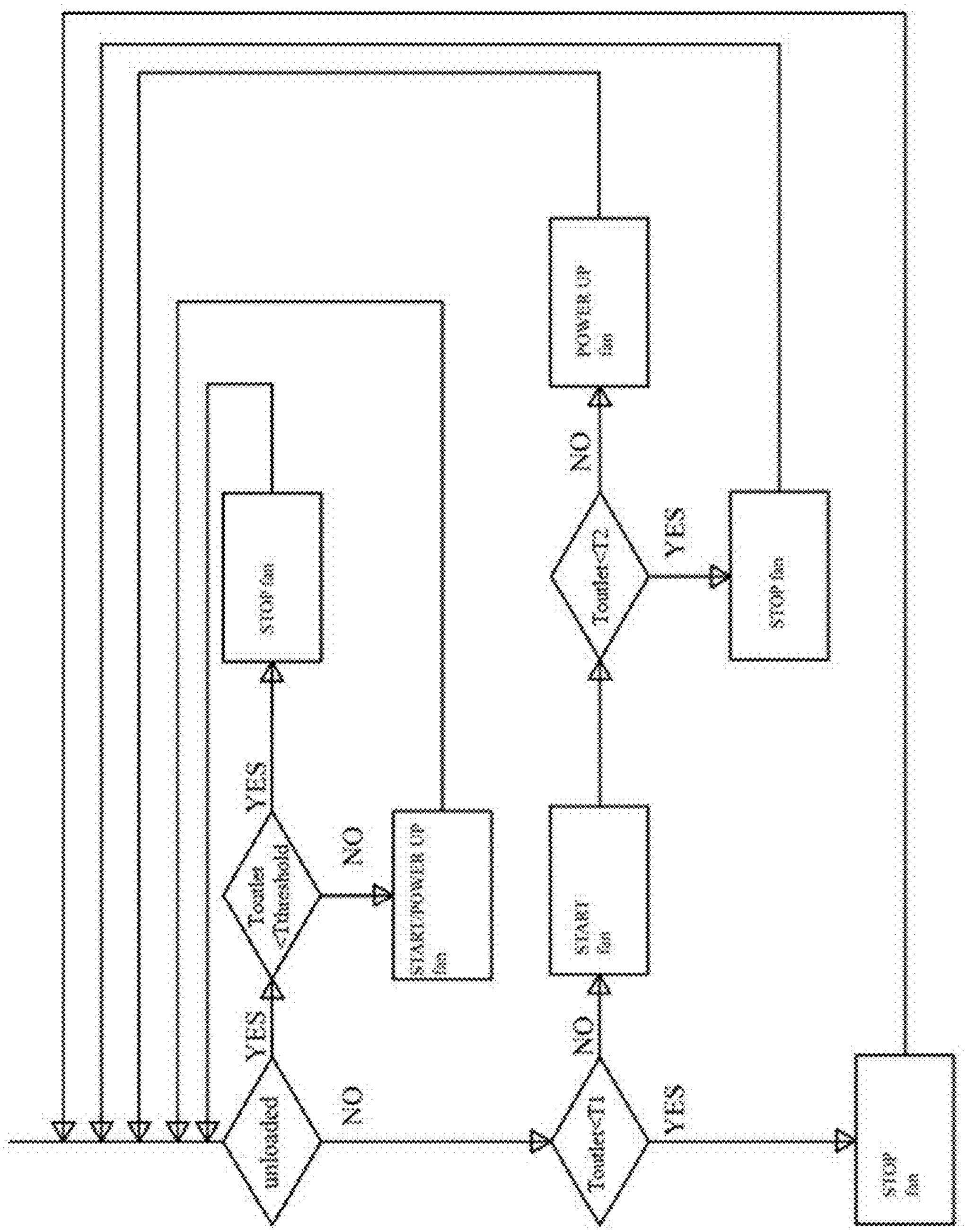
Figure 5:
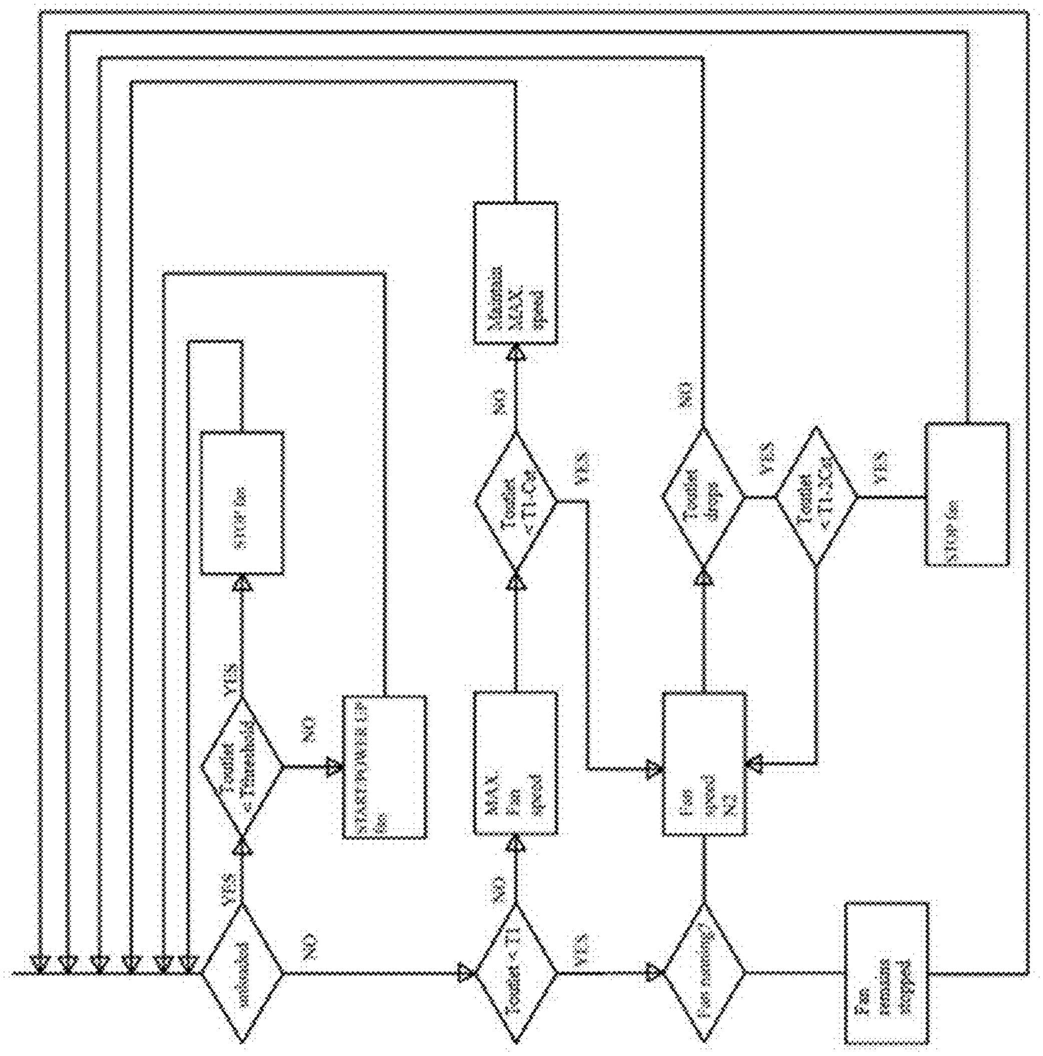

FIG. 1 schematically shows an air-cooled compressor device 1 for the production of compressed gas having a compressor element 2 that comprises an inlet 3 for gas to be compressed and an outlet 4 for compressed gas.

Said compressor element 2 can be of any type, for example, a screw compressor, a reciprocating compressor, a turbo compressor or the like.

In this case, the compressor element 2 is driven by a motor 5 that runs at a constant speed. In compressor devices 1 having higher powers, such a motor 5 can be started and stopped only a limited number of times per unit of time. For this reason, the compressor element 2 is allowed to run unloaded when there is no demand for compressed gas instead of stopping the motor 5.

This motor 5 can be, for example, an electric motor or an internal combustion engine.

The compressor device 1 is provided with an oil circuit 6 for cooling and possibly lubricating and sealing the compressor element 2. However, it cannot be ruled out that another cooling medium, such as water, is used instead of oil.

The oil circuit 6 comprises a first oil line 7 and a second oil line 8 and an oil reservoir 9.

The oil in the oil circuit 6 is injected into the compressor element 2 and leaves the compressor element 2 together with the compressed gas via the outlet 4 of the compressor element 2.

To remove oil particles from the compressed gas, the outlet 4 is connected to an oil separator 10. Said oil separator 10 has an inlet 11 for compressed gas and two outlets, namely a first outlet 12 for compressed gas and a second outlet 13 for the separated oil.

The second outlet 13 is connected to an oil cooler 14 for cooling the oil in the oil circuit 6. Said oil cooler 14 is air-cooled and provided with a fan 15 for accelerated heat exchange.

After cooling in the oil cooler 14, the oil is collected in the oil reservoir 9 to be used again and injected into the compressor element 2.

In order to realize the above, the oil circuit 6 is provided with the aforementioned first oil line 7, which runs from the second outlet 13 to the oil reservoir 9. The aforementioned oil cooler 14 is also housed in said first oil line 7. The aforementioned second oil line 8 runs from the oil reservoir 9 to one or more injection points 16 of the compressor element 2.

Compressed gas, free of oil particles, leaves the oil separator 10 via the first outlet 12 to which a pressure line 17 is connected. An after-cooler 18 is optionally provided in the pressure line 17.

In this case, said after-cooler 18 is also cooled by the same fan 15 as the oil cooler 14, although said after-cooler 18 could also be provided with a separate fan 15.

The compressor device 1 is further provided with a controller 19, which in this case has two sensor inputs 20, 21 and two actuator outputs 22, 23.

A first sensor input 20 is connected to a temperature sensor 24 that is arranged at the level of the outlet 4 of the compressor element 2 and that measures the temperature of the compressed gas at the outlet 4 of the compressor element 2.

A second sensor input 21 is connected to a sensor 25 that measures a dew point of the compressed gas.

However, it cannot be ruled out that the temperature at the outlet 4 of the compressor element 2 and/or the dew point are calculated or estimated by the controller 19, on the basis of the measurement data of one or more sensors measuring, for example, the environmental parameters, or that this value or these values can be entered into the controller 19.

Said sensor 25 for measuring the dew point is located downstream of the after-cooler 18, where the compressed gas leaves the compressor device 1.

A first actuator output 22 is used to control the fan 15 based on the input values of the first sensor input 20 and the second sensor input 21. This control is explained in more detail with reference to the figures below.

A second actuator output 23 is connected to an inlet valve 26 located at the level of the inlet 3 of the compressor element 2. Said inlet valve 26 is used to close the inlet 3 during unloaded running or to open it during loaded running.

According to the invention, the fan 15 is turned off when the compressor element 2 is running unloaded and when there is no demand for compressor gas.

In a first embodiment, the fan 15 has only one fixed speed. In short, said fan 15 can thus only be switched on or off.

A method for controlling such a fan 15 having one speed is shown in FIG. 2.

In this example, the controller 19 checks whether the compressor element 2 is running unloaded. If this is the case, the inlet valve 26 is closed.

If the compressor element 2 is running unloaded and if the temperature at the outlet 4 of the compressor element 2 is lower than a specific threshold temperature, the fan 15 is stopped or not started.

This specific threshold temperature can be chosen at will, but is always higher than the dew point.

When the compressor element 2 is running unloaded but the temperature at the outlet 4 of the compressor element 2 is higher than the specific threshold temperature, the fan 15 is started or remains switched on.

When the compressor element 2 is running under load, the fan 15 is switched on when the temperature at the outlet 4 of the compressor element 2 exceeds a specific first temperature T1.

However, when the temperature at the outlet 4 of the compressor element 2 falls below a specific second temperature T2, the fan 15 is switched off.

The fan 15 is not switched on again until the temperature at the outlet 4 of the compressor element 2 rises above the first temperature T1.

In this case, the first temperature T1 is equal to the second temperature T2 plus a certain value, in this case 12° C. However, it cannot be ruled out that this value is between 10 and 15° C. or even between 5 and 20° C.

In this case, the second temperature T2 is at least equal to the dew point at the outlet 4 of the compressor device 2. Said dew point is, as already explained above, measured by the sensor 25 for the dew point but can also be estimated or calculated based on a measurement of environmental parameters.

For example, the second temperature T2 is chosen to be equal to the dew point plus a certain fixed value of, for example, 2° C.

In this example, but not necessarily, the threshold temperature is equal to the second temperature T2.

In this example, but not necessarily, the dew point is measured continuously, but it cannot be ruled out that the dew point is measured or queried by the controller 19 at regular intervals.

In this example, the fan 15 is provided with a timer 27 that measures the time after the fan 15 is switched on. This timer 27 ensures that the fan 15 is switched off according to the method only if the time measured by the timer 27 is greater than a preset value.

Said timer 27 limits the number of starts and stops of the fan 15.

Said timer 27 does not need to be provided in the proximity of the fan 15, but can also be embedded in the controller 19 or can be located at a different location, for example in an electrical control box.

The first alternative embodiment, as illustrated in FIG. 3, shows a method in which use is made of a fan 15 that, in this case, can run at two different fixed speeds. In practice, however, the number of different speeds is unlimited.

In a loaded state of the compressor element 2, the method comprises the following steps:

- when the fan 15 is switched on because the temperature at the outlet 4 of the compressor element 2 exceeds the first temperature T1: run the fan 15 at maximum speed;
- if the temperature at the outlet 4 of the compressor element 2 drops after the fan 15 is switched on, the speed of the fan 15 is gradually reduced when the temperature falls below the first temperature T1 reduced by a constant, wherein the constant becomes progressively larger for each further reduction in the speed of the fan 15;
- when the temperature at the outlet 4 of the compressor element 2 does not decrease after the fan 15 is switched on or after the speed of the fan 15 is reduced, the speed of the fan 15 is gradually increased until the temperature at the outlet 4 no longer increases or remains the same until the maximum speed of the fan 15 is reached;
- when the temperature at the outlet 4 of the compressor element 2 falls below a certain second temperature T2: switch off the fan 15.

More specifically, the fan 15 runs at its maximum speed when the temperature at the outlet 4 of the compressor element 2 is higher than the first temperature T1. If the temperature at the outlet 4 is higher than the first temperature T1 reduced by the constant, the fan 15 maintains its maximum speed.

However, if the temperature at the outlet 4 is lower than the first temperature T1 reduced by the constant, the fan 15 runs at one speed lower, namely at the speed N2.

However, if the temperature at the outlet 4 does not decrease, the fan 15 again runs at one speed higher.

If the temperature at the outlet 4 does decrease and said temperature is higher than the first temperature T1 reduced by twice the constant, the speed N2 is maintained.

If the temperature at the outlet 4 does decrease but is still lower than the first temperature T1 reduced by twice the constant, the fan 15 is stopped, after which the flow chart is executed again.

If the temperature at the outlet 4 is lower than the first temperature T1 and the fan 15 was already running, the lower speed, in this case the speed N2, is maintained. However, if the fan 15 has already stopped, it will remain stopped.

Such a method ensures that the fan 15 always runs at an appropriate speed to cool the oil cooler 14 as efficiently as possible and also limits the number of starts and stops of the fan 15.

Figure 4:
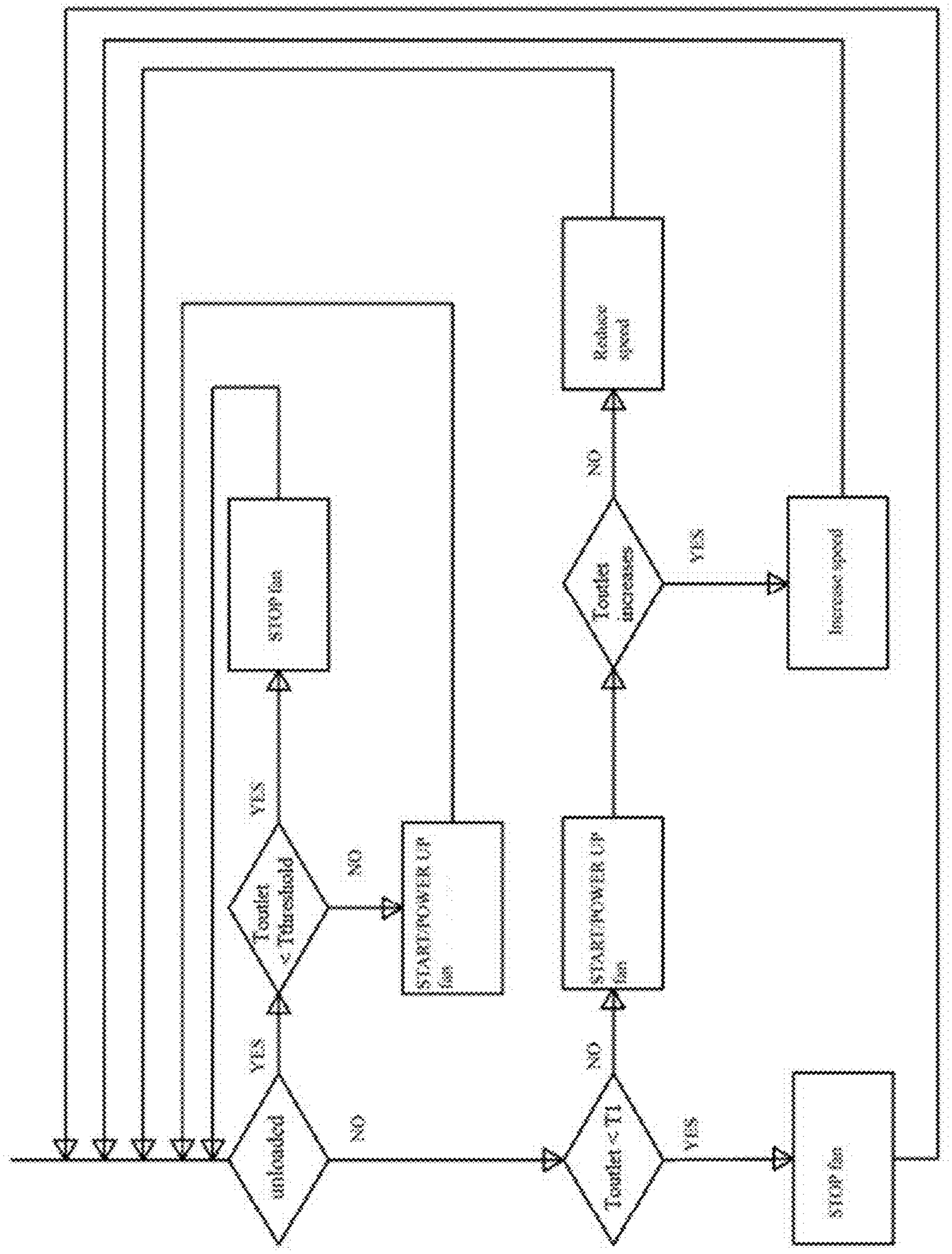
FIG. 4 schematically shows a second alternative method for controlling the air-cooled compressor device from FIG. 1.

Another alternative embodiment makes use of a fan 15 having a variable or controllable speed, the method of which is shown in FIG. 4.

Said method comprises the step of regulating the speed of the fan 15 in such a way that the temperature at the outlet 4 is between the first temperature T1 and the second temperature T2.

In practice, the controller 19 checks whether the temperature at the outlet 4 of the compressor element 2 is higher than the first temperature T1, after which the fan 15 is started or left running. If the temperature at the outlet 4 of the compressor element 2 then increases, the speed of the fan 15 is increased.

However, if the aforementioned temperature at the outlet 4 decreases, the speed of the fan 15 is also decreased. At the moment when the temperature at the outlet 4 of the compressor element 2 is lower than the first temperature T1, the fan 15 is stopped, after which the flow chart is executed again.

In this case, the fan 15 always runs at optimum speed, thus cooling the oil cooler 14 as efficiently as possible.

The present invention is by no means limited to the embodiments described as examples and shown in the figures, but a method for controlling an air-cooled compressor or vacuum pump device and an air-cooled compressor or vacuum pump device according to the invention can be implemented according to different variants without departing from the scope of the invention as defined in the claims.

The invention claimed is:

1. A method for controlling an air-cooled compressor or vacuum pump device (1) for compressing a gas, which is provided with a motor (5) having a fixed speed, wherein the compressor or vacuum pump device (1) is provided with an air-cooled cooler (14) having a fan (15) for cooling a cooling medium that is injected into a compressor or vacuum pump element of the compressor or vacuum pump device, respectively, characterized in that the method comprises the step of switching off the fan (15) when the compressor or vacuum pump device (1) is running unloaded, and that the fan (15) is provided with a timer (27) that measures the time after the fan (15) has been switched on and in that the fan (15) is switched off or reduced in speed according to the method only if the time measured by the timer (27) is also greater than a preset value.

2. The method according to claim 1, characterized in that the method comprises the additional step of switching off the fan (15) when the compressor or vacuum pump device (1) is running unloaded if the temperature at an outlet (4) of the compressor or vacuum pump element (2) is below a certain threshold temperature, wherein the threshold temperature is higher than the dew point of compressed gas.

3. The method according to claim 1, characterized in that, when the compressor or vacuum pump device (1) is running unloaded, the method comprises the additional step of controlling the fan (15) according to the following rule:

- when the temperature at an outlet (4) of the compressor or vacuum pump element (2) exceeds a first temperature (T1): switch on the fan (15).

4. The method according to claim 3, characterized in that the fan (15) has a fixed speed and in that the method comprises the following step:

- when the temperature at the outlet (4) of the compressor or vacuum pump element (2) falls below a second temperature (T2): switch off the fan (15).

5. The method according to claim 4, characterized in that the aforementioned first temperature (T1) is equal to the second temperature (T2) multiplied by a specific value.

6. The method according to claim 5, characterized in that the aforementioned specific value is between 5 and 20° C.

7. The method according to claim 6, characterized in that the aforementioned specific value is between 10 and 15° C.

8. The method according to claim 4, characterized in that the aforementioned second temperature (T2) is at least equal to a dew point of the gas at the outlet of the compressor or vacuum pump device (1), wherein said dew point is measured or calculated based on a measurement of environmental parameters.

9. The method according to claim 8, characterized in that the dew point is measured or calculated at regular intervals or on a continuous basis.

10. The method according to claim 3, characterized in that the fan (15) has N different fixed speeds, and in that the method comprises the following steps:

when the fan (15) is switched on because the temperature at the outlet (4) of the compressor or vacuum pump element (2) exceeds a: the certain-first temperature (T1): run the fan (15) at maximum speed;

if the temperature at the outlet (4) drops after the fan (15) is switched on, the speed of the fan (15) is gradually reduced when the temperature falls below the first temperature (T1) reduced by a constant, wherein the constant becomes progressively larger for each further reduction in the speed of the fan (15);

when the temperature at the outlet (4) does not decrease after the fan (15) is switched on or after the speed of the fan (15) is reduced, gradually increase the speed of the fan (15) until the temperature at the outlet (4) no longer increases or remains the same or until the maximum speed of the fan (15) is reached;

when the temperature at the outlet (4) of the compressor or vacuum pump element (2) falls below a certain second temperature (T2): switch off the fan (15).

11. The method according to claim 3, characterized in that the fan (15) has a variable speed and in that the method comprises the following steps:

regulating the speed of the fan (15) so that the temperature at the outlet (4) is between the first temperature (T1) and a second temperature (T2).

12. An air-cooled compressor or vacuum pump device provided with a motor (5) having a fixed speed, wherein the compressor or vacuum pump device (1) is provided with an air-cooled cooler (14) having a fan (15) for cooling a cooling medium that is injected into a compressor or vacuum pump element of the compressor or vacuum pump device, respectively, characterized in that the fan (15) is provided with a controller (19) that is provided with a control algorithm for carrying out a method according to claim 1.

13. The air-cooled compressor or vacuum pump device according to claim 12, characterized in that the compressor or vacuum pump device (1) is provided with an after-cooler (18), wherein the after-cooler (18) is part of or integrated with the aforementioned air-cooled cooler (14).

* * * * *